United States Patent
Lewis

(10) Patent No.: US 7,350,812 B2
(45) Date of Patent: Apr. 1, 2008

(54) VEHICLE PASSENGER RESTRAINT AND METHOD OF PRODUCING SAME

(75) Inventor: Alan R. Lewis, Indianapolis, IN (US)

(73) Assignee: Bald Spot Racing, LLC, Indianapolis, IN (US)

( * ) Notice: Subject to any disclaimer, the term of this patent is extended or adjusted under 35 U.S.C. 154(b) by 317 days.

(21) Appl. No.: 10/796,743

(22) Filed: Mar. 9, 2004

(65) Prior Publication Data

US 2004/0169361 A1    Sep. 2, 2004

Related U.S. Application Data

(62) Division of application No. 10/196,461, filed on Jul. 16, 2002, now Pat. No. 6,733,710.

(51) Int. Cl.
    *B60R 21/045* (2006.01)
(52) U.S. Cl. .................................................. 280/752
(58) Field of Classification Search ................ 280/752; 297/452.25, 452.33, 450.25, 487, 488, 452.34
    See application file for complete search history.

(56) References Cited

U.S. PATENT DOCUMENTS

| 4,347,213 | A |   | 8/1982 | Rogers, Jr. |
| 4,821,200 | A |   | 4/1989 | Oberg |
| 6,550,858 | B1 |   | 4/2003 | Grohs et al. |
| 6,713,001 | B1 | * | 3/2004 | Cannon et al. ............. 264/40.1 |
| 6,858,550 | B2 | * | 2/2005 | Ahluwalia ................... 442/136 |
| 2005/0168041 | A1 | * | 8/2005 | Glance et al. ......... 297/452.18 |

* cited by examiner

*Primary Examiner*—Faye M. Fleming
(74) *Attorney, Agent, or Firm*—Woodard, Emhardt, Moriarty, McNett & Henry LLP

(57) ABSTRACT

An expanded propylene vehicle passenger restraint. The restraint includes a back portion, seat portion and side portions integrally joined together. A removable back insert is mounted to the back portion and a leg separator is mounted to the seat portion. The method of producing the restraint includes the step of scanning the configuration of the restraint into a router for shaping a solid plastic piece in accordance with the configuration.

9 Claims, 5 Drawing Sheets

VEHICLE PASSENGER RESTRAINT AND METHOD OF PRODUCING SAME

CROSS-REFERENCE TO RELATED APPLICATIONS

The present application is a divisional application of U.S. patent application Ser. No. 10/196,461 filed on Jul. 16, 2002 now U.S. Pat. No. 6,733,710.

BACKGROUND OF THE INVENTION

The present invention is in the field of vehicle passenger restraints. More specifically, the restraint is of the type that surrounds and holds the passenger in place during a crash.

DESCRIPTION OF THE PRIOR ART

In high-speed vehicles, including those utilized in race cars, it is the practice to surround the driver with a form fitting restraint to limit movement of the driver relative to the race car. High-speed crashes are frequently encountered in of all forms of racing resulting in the car impacting another car or the outside retaining wall. A solution has been to produce an expanded polystyrene seat that absorbs some crash force and is destroyed in the process of the accident.

The prior seats are produced by bending a single sheet of thin plastic 15 (FIG. 1) about its mid-point 16 and then sealingly joining the opposite extending edge portions 17 and 18. The opposite end edges 19 and 20 are left open until the resultant bag 14 formed by the sheet is filled with expanded polystyrene beads that are poured through the opening 21 formed by edges 19 and 20. A curing agent along with an epoxy resin is also poured through the opening and the opposite edges 19 and 20 are then sealed together. In one embodiment, the expanded polystyrene beads have a density of approximately 2-3 lbs./ft.$^3$ The epoxy resin and curing agent is available from Shell Chemical with the resin being bisphenol f/epichlorodydrin and the curing agent being Epi-Curi 3140. The resin bonds around each bead. The beads within the bag formed by sheet 15 are then kneaded together so that the bag assumes a flat condition. A hole is then formed in the sheet and an air valve 22 is mounted to the sheet allowing air to be withdrawn from the bag.

Bag 14 is inserted into the tub 23 (FIG. 2) of the race car and forced downwardly forming a back portion 24 and a seat portion 25. Next, the driver climbs into the tub and sits atop bag 14. The plastic beads and resin within the bag form a flexible plastic material enabling the bag to extend around the driver's back, seat, and legs providing a tailored or form fitting back and seat support. The opposite edges 26 and 27 of bag 14 may be pulled upwardly to form side portions extending on the opposite sides of the legs and torso of the driver.

The driver remains in the tub of the car for approximately 2-3 hours allowing the beads within the bag to slowly extend around the opposite sides of the driver and eventually harden. Once the flexible plastic within the bags starts to set-up, a vacuum is created within the bag by withdrawing air through conventional means via valve 22. Eventually, the material within the bag is completely hardened allowing the excess sheet and beads located out of the tub to be trimmed from the final product. The resultant product is a hardened polystyrene, form fitting restraint that limits movement between the driver and car; however, due to the nature of polystyrene, the product will shatter during the force absorption encountered in a crash condition. The product therefore has a very limited life that expires upon a crash. The entire process must therefore be repeated requiring the driver to once again sit in the tub as the product is formed. Disclosed herein is a new vehicle passenger restraint. Partially formed in accordance with the aforementioned method, the new restraint provides many of the advantages thereof and can be utilized in multiple crashes without requiring the process of manufacture to be repeated after each crash.

SUMMARY OF THE INVENTION

One embodiment of the present invention is a method of producing a restraint for a passenger of a vehicle comprising the steps of placing an enclosure of flexible plastic within a vehicle; placing a passenger of the vehicle atop and adjacent said enclosure while in said vehicle; allowing the flexible plastic to form around the passenger forming a plastic restraint; removing the passenger from the vehicle; causing the plastic restraint to harden; removing the plastic restraint from the vehicle; scanning the plastic restraint to profile the plastic restraint; and shaping solid plastic in accordance with the profile of the plastic restraint producing a passenger restraint.

Another embodiment of the present invention is a restraint for a passenger in a vehicle comprising a seat having a seat portion, a back portion and side portions connected together forming a cavity tailored shaped to form fit around a specific passenger of a vehicle limiting motion of the passenger relative to the vehicle. The seat is formed from a plastic having resistance to fire and heat and maintains its shape when subjected to crash conditions.

It is an object of the present invention to provide a new and improved method for producing a vehicle passenger restraint closely form fitted to the passenger that may be utilized after numerous crashes.

A further object of the present invention is to provide a vehicle passenger restraint for insertion into a race car that maintains its structural integrity during multiple crashes.

Related objects and advantages of the present invention will be apparent from the following description.

DESCRIPTION OF THE PREFERRED EMBODIMENTS

Figure 1:
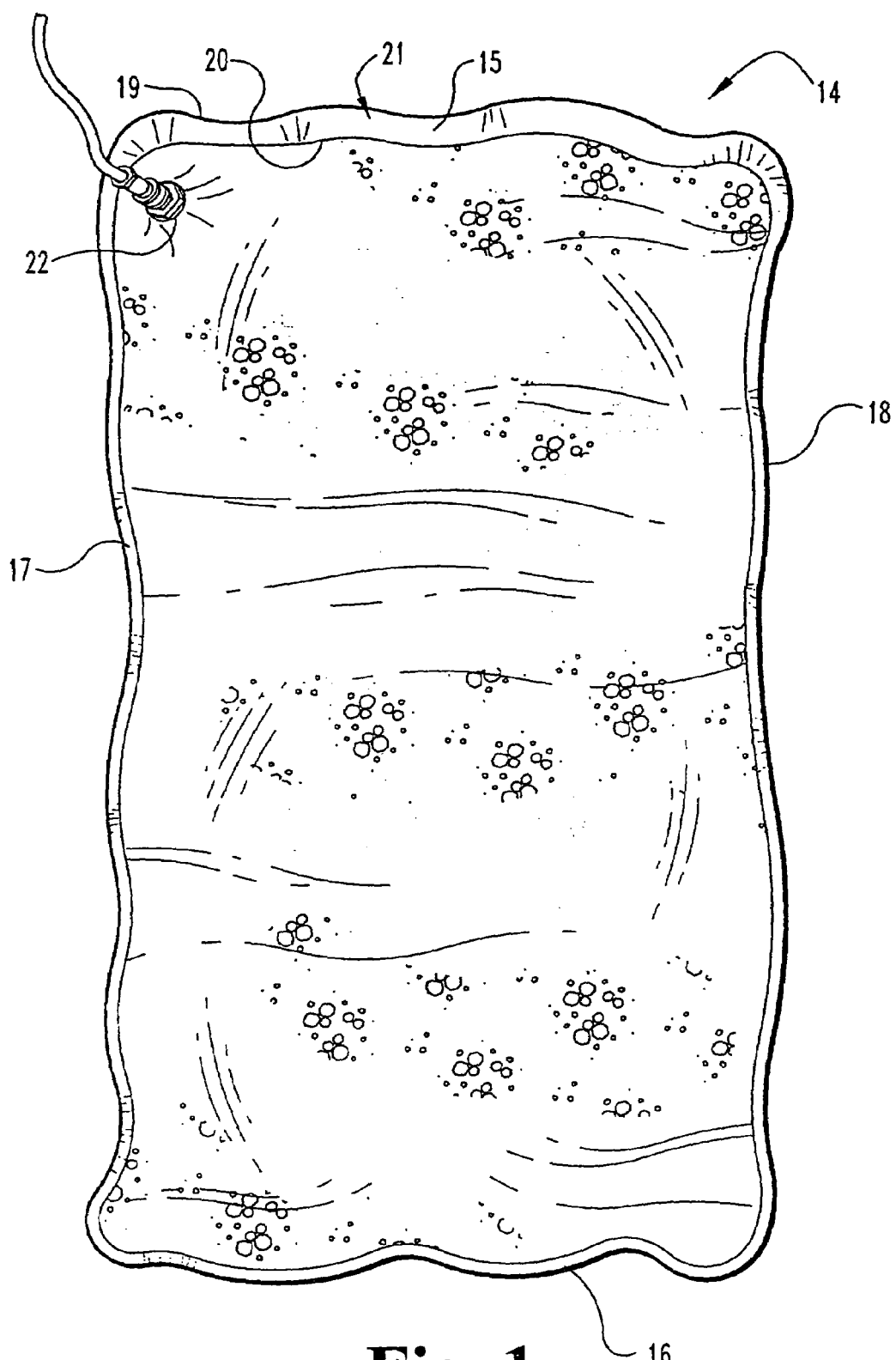
FIG. 1 is a perspective view of the prior art bag of expanded polystyrene for use in producing the prior art passenger restraint shown in FIG. 2.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Expanded polypropylene (EPP) is distinguishable from expanded polystyrene (EPS) in that the EPP will elastically deform and will not crumble and be destroyed in crash conditions such as previously described for the EPS vehicle passenger restraint. At the same time, it is desirable to produce an EPP vehicle passenger restraint that has portions or inserts that will be flexible to the point of destruction thereby ensuring that the impact force is not directed by the passenger restraint into the passenger with the insert being readily removable and replaced after destruction.

Figure 2:
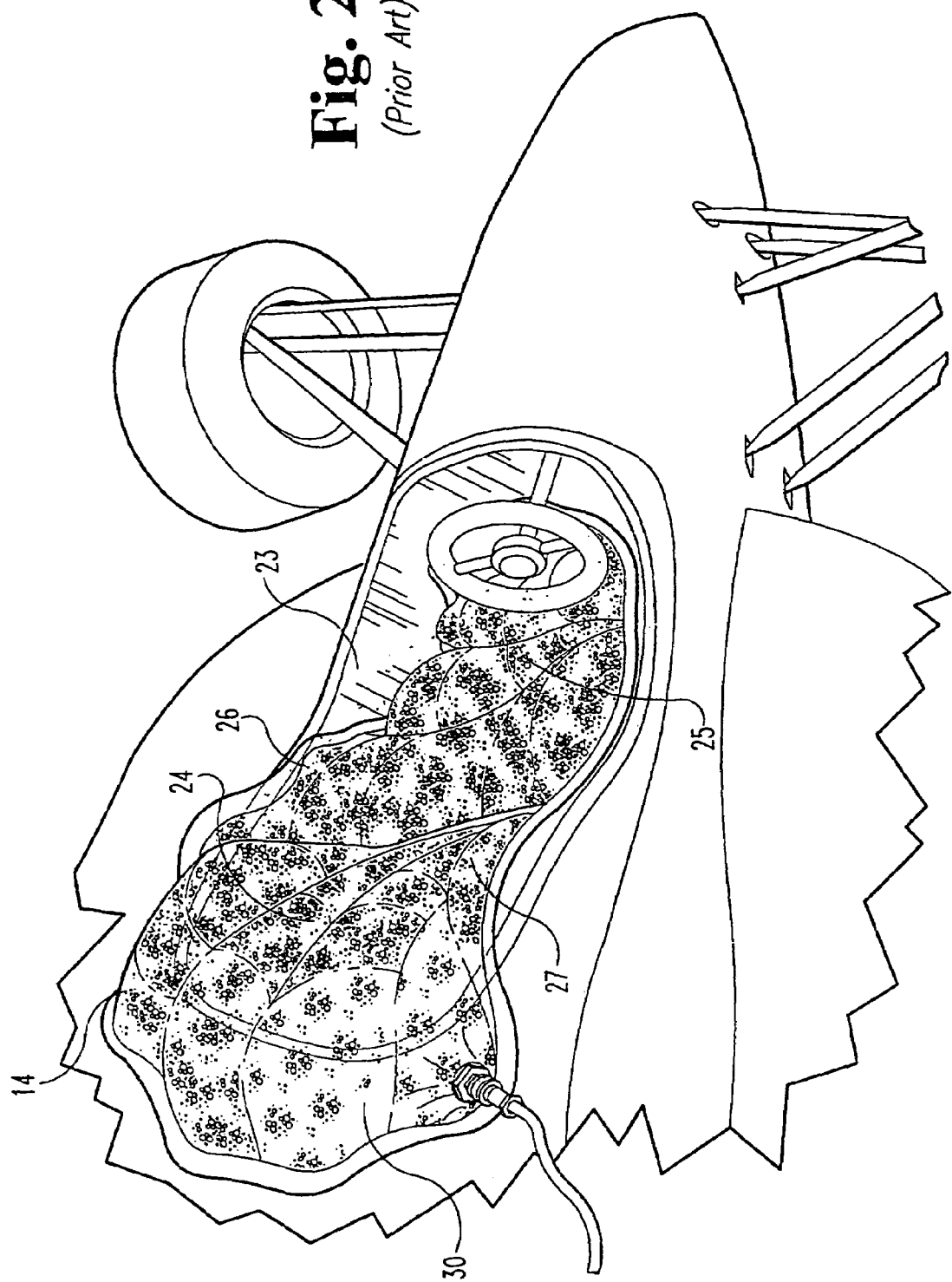
FIG. 2 is a top fragmentary perspective view of the prior art passenger restraint 30 produced from expanded polystyrene inserted into a vehicle.

The new method of producing the vehicle passenger restraint includes the aforementioned steps described in the description of the prior art of placing an enclosure 14 (FIG. 1) of flexible plastic within a vehicle (FIG. 2) and then placing the passenger of the vehicle adjacent the enclosure while it is in the vehicle.

The flexible plastic is allowed to form around the passenger forming a plastic restraint with the passenger then being removed and the plastic restraint being allowed to harden providing a product to limit movement of the passenger or driver relative to the vehicle.

The expanded polystyrene product is then used as a model to create an expanded polypropylene passenger restraint. First, the expanded polystyrene passenger restraint must be removed from the tub of the vehicle. In certain cases, it may be necessary to cut the previously formed product into two separate pieces to facilitate the removal process. Once the polystyrene passenger restraint is removed from the tub, the external geometric configuration of the product is scanned by conventional means and fed to a cad system. In the event the EPS passenger restraint is severed into two pieces during the removal from the tub, it is necessary to reattach the pieces together forming a unitary construction composed of the back portion 24, seat portion 25, and opposite side portions 26 and 27. In one embodiment, the EPS product is sprinkled with talcum allowing use of a laser scanner to obtain and feed the geometric configuration including dimensions and shapes into a conventional cad system. A profile of passenger restraint 30 is then fed to a commercially available CNC router tool that is used to cut a solid block of expanded polypropylene producing a vehicle passenger restraint identical to the shape and size of passenger restraint 30. As a result, the single impact vehicle passenger restraint produced from EPS is utilized to obtain a multiple impact restraint produced from EPP.

Figure 3:
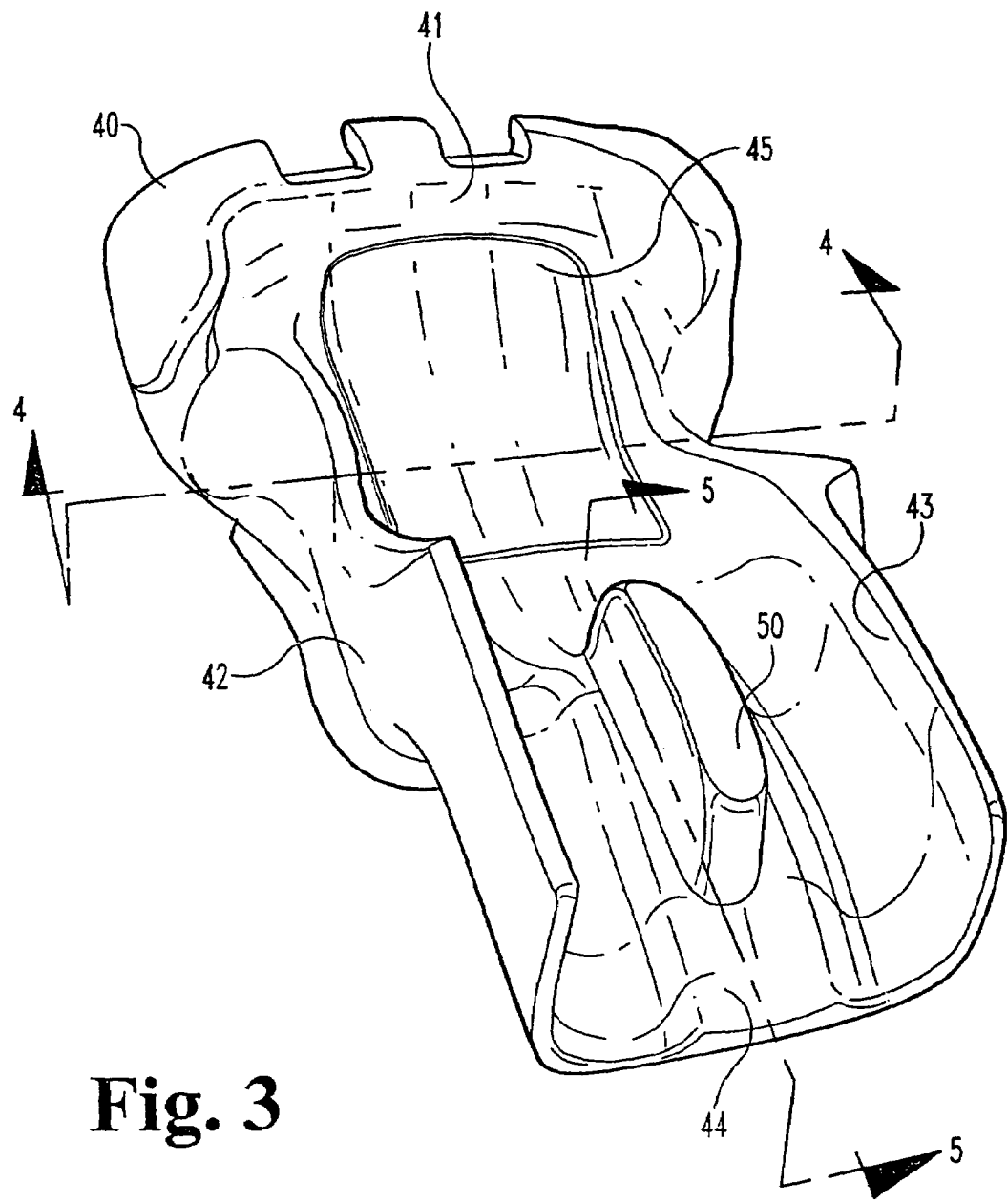
FIG. 3 is a perspective view of the preferred embodiment of the passenger restraint made in accordance with the present invention.

The EPP vehicle passenger restraint 40 (FIG. 3) is identically sized and shaped as compared to passenger restraint 30 and thus includes a back portion 41, two side portions 42 and 43 and a seat portion 44 integrally joined together. Restraint 40 is a rigid structure that elastically deforms upon impact and then returns to its original configuration. Thus, restraint 40 is produced from solid plastic and has elasticity greater than restraint 30.

Removably mounted to back portion 41 is a back insert 45 that may be produced from a modified EPS. Back insert 45 supports the passenger's back. The insert absorbs impact forces limiting movement of the passenger's back and in the process is destroyed. Thus, insert 45 has a greater shock absorption than the main body of the restraint although insert 45 is destroyed in the process. Upon each crash, insert 45 is replaced. In one embodiment, insert 45 is produced from GECET, available from Huntsman Chemical, Houston, Tex. An alternate material for use in producing insert 45 is a modified PPE/PS blend available from GE Plastics under the trademark NORYL.

Figure 4:
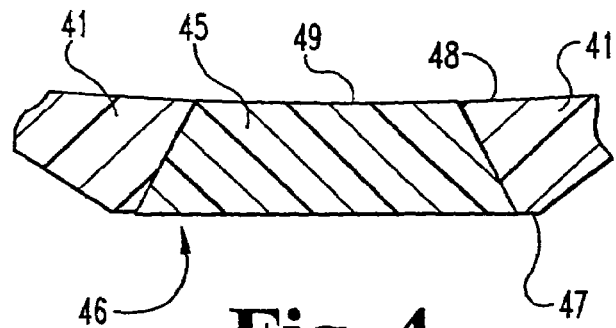
FIG. 4 is a cross-sectional view taken along the line 4-4 of FIG. 3 and viewed in the direction of the arrows.
Figure 5:
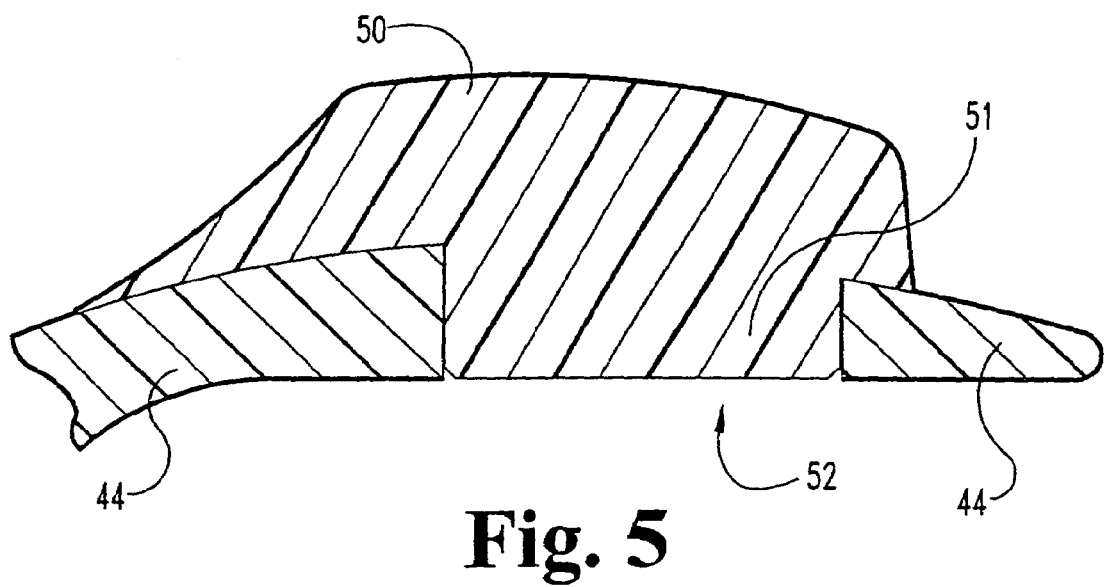
FIG. 5 is a cross-sectional view taken along the line 5-5 of FIG. 3 and viewed in the direction of the arrows.
Figure 6:
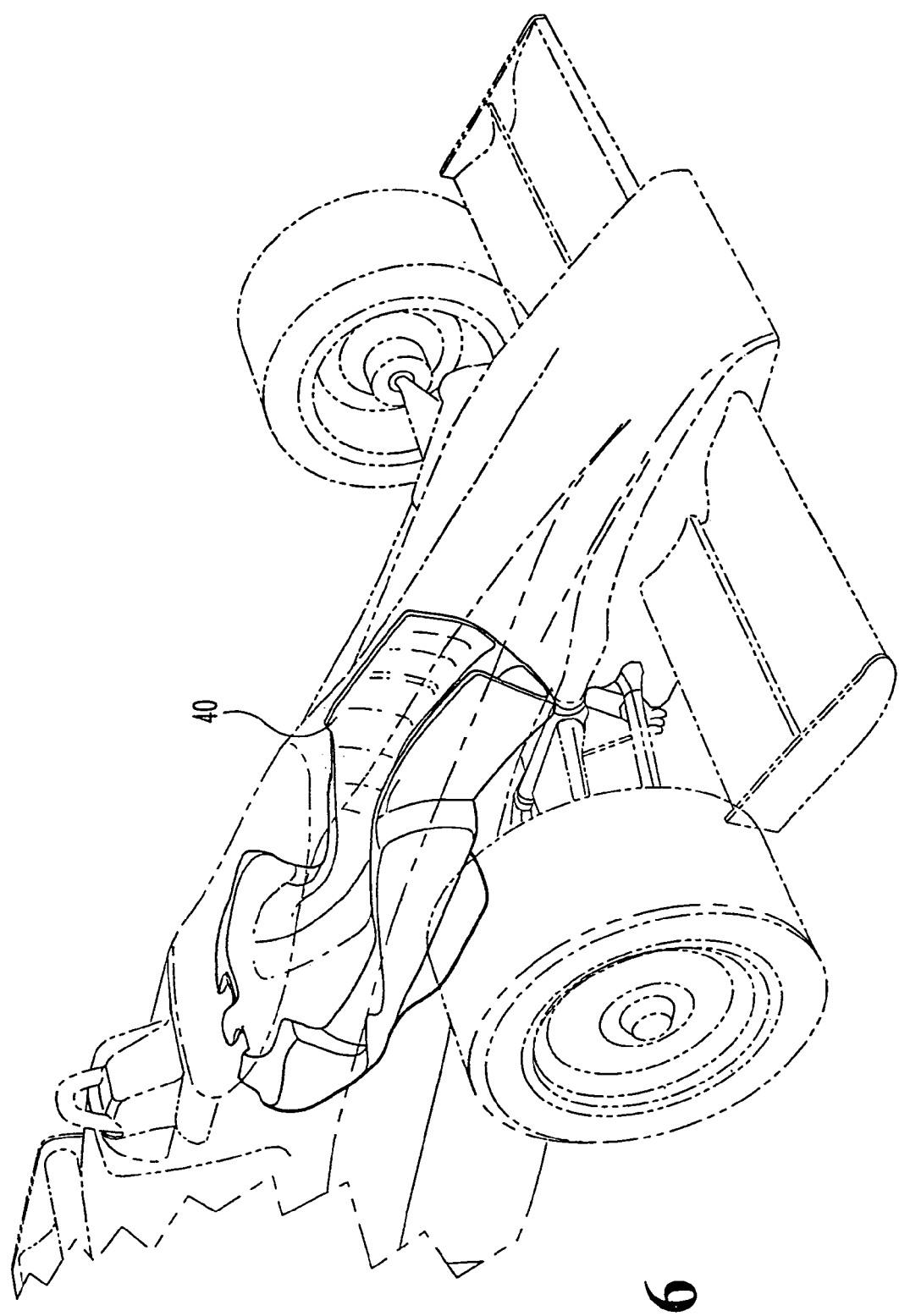
FIG. 6 is a fragmentary perspective view of the passenger restraint of FIG. 3 inserted in a vehicle.

Back portion 41 (FIG. 4) includes a tapered opening 46 extending therethrough that is larger on the rear surface 47 than the front surface 48 of the back support. Insert 45 likewise is wedge shaped having a smaller size facing the passenger as compared to the larger size on the rear of the insert. Thus, insert 45 may be mounted to back portion 41 by installing the insert from the rear surface 47 of the back support and then press fitting or forcing the insert through opening 46 until the outwardly facing surface 49 of the insert is aligned with front surface 48 of back portion 41.

A removable leg or thigh separator 50 is mounted to seat portion 44 and has a downwardly projecting rib 51 extending through a complimentarily shaped opening 52 of bottom portion 44. Separator 50 is produced from EPS and may be destroyed during crash allowing a new separator to be mounted along with insert 45 while the main body of the seat restraint 40 is reused. In certain crash conditions, separator 50 must first be removed before it is possible to remove the driver from the tight fitting restraint. Thus, it is desirable to produce separator 50 from an easily destroyable material, such as, EPS.

Seat restraint 40 being produced from expanded polypropylene has a greater resistance to fire and heat while maintaining its shape during a fire crash as compared to restraint 30 produced from expanded polystyrene. Polystyrene quickly melts when exposed to fire and heat as compared to expanded polypropylene.

The laser scanning of the EPS seat 30 may be accomplished by any number of commercially available scanners. Likewise, computer software is commercially available to create the profile and instructions for the machine router utilized to create passenger restraint 40 from a solid piece of EPP. For example, the following software may be utilized: PRO NC available from The Product Development Company of Needham, Mass.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A restraint for a passenger in a vehicle comprising:
   a seat having a seat portion, a back portion and side portions connected together forming a cavity tailored shaped to form fit around a specific passenger of a vehicle limiting motion of the passenger relative to the vehicle, said seat formed from a plastic having resistance to fire and heat and maintaining its shape when subjected to crash conditions,
   a back insert removably mounted to said back portion and replaceable when destroyed during crash; and
   said seat is produced from expanded polypropylene;
   said seat portion, said back portion and said side portions are integrally connected together in a unitary main body being produced from a single piece of plastic, said back portion includes an opening extending therethrough in which said back insert is force fitted mounted therein,
   and further comprising a back insert removably mounted to said back portion and replaceable when destroyed during crash, said seat is produced from expanded polypropylene; and, a leg separator insert including a rib extending into said seat portion mounting said leg separator thereto.

2. The restraint of claim 1 wherein:
said back insert and said leg separator are produced from expanded polystyrene.

3. The restraint of claim 2 wherein:
said back insert includes a forwardly facing surface and a rearwardly facing surface with said back insert tapering from a larger size at said rearwardly facing surface to a smaller size at said forwardly facing surface; and,
said back portion of said seat includes an opening extending therethrough complementary in shape to said back insert allowing said back insert to be installed thereon by moving said back insert through said opening in a direction from said rearwardly facing surface toward said forwardly facing surface.

4. A race car driver restraint comprising:
a unitary piece of expanded polypropylene cut to form a driver restraint with a back portion, seat portion and side portions integrally connected together forming a seat, said back portion including a hole extending therethrough;
a back insert removably mounted to said back portion within said hole; and,
a leg separator mounted to said seat portion.

5. The driver restraint of claim 4 wherein:
said leg separator includes a rib extending into said seat portion securing said separator to said seat portion; and
said back insert and said hole are complementarily tapered providing a force fit between said back insert and said seat portion.

6. The driver restraint of claim 5 wherein:
said back insert and said leg separator are expanded polystyrene and are replaced when destroyed during crash.

7. A race car driver restraint comprising:
a unitary piece cut to form a driver restraint with a back portion, seat portion and side portions integrally connected together forming a seat, said back portion including a hole extending therethrough;
a back insert removably mounted to said back portion within said hole; and,
a leg separator mounted to said seat portion.

8. The restraint of claim 4 wherein said unity piece is produced from expanded plastic.

9. The restraint of claim 8 wherein said back insert is produced from expanded polystyrene.

* * * * *